Feb. 19, 1957     E. C. BERGQUIST ET AL     2,782,027
TORSION SPRING SUSPENSION
Filed June 30, 1953

INVENTORS.
Ernest C. Bergquist
John A. Buvelot

United States Patent Office 2,782,027
Patented Feb. 19, 1957

2,782,027

TORSION SPRING SUSPENSION

Ernest C. Bergquist and John A. Buvelot, Chicago, Ill., assignors to American Steel Foundries, Chicago, Ill., a corporation of New Jersey Application June 30, 1953, Serial No. 364,984

12 Claims. (Cl. 267—58)

The invention relates to a novel wheel suspension assembly which may be used to support a related vehicle or the like.

The invention contemplates a fixed axle, a crank rotatably secured to the axle and carrying a spindle eccentrically of the axle, a coiled spring sleeved over the axle, and a housing containing both the axle and the spring.

A primary object of the invention is to provide a novel effective suspension means in a minimum of space.

A further object of the invention is to employ the resilient action of a torsion spring to support a wheel from the related axle.

A specific object of the invention is to provide a multiple demountable axle permitting easy and quick change of the static position of the wheel carrying crank.

These and other objects of the invention will become apparent from an examination of the attached specification and concerned drawings, wherein.

Figure 1:
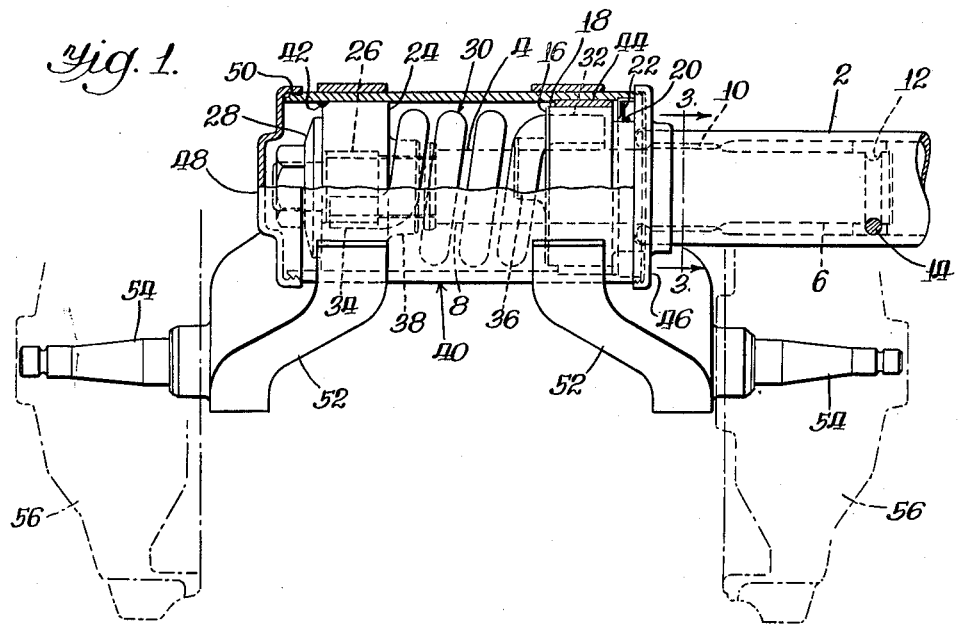
Figure 1 is a fragmentary portion of the axle assemblies, a partial section being taken through the upper half of the housing.
Figure 2:
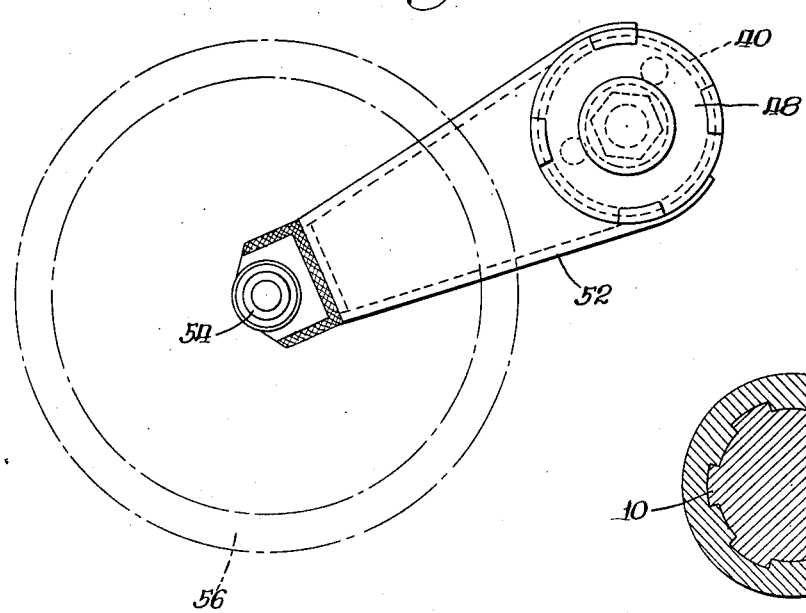
Figure 2 is a side elevational view of the structure shown in Figure 1.
Figure 3:
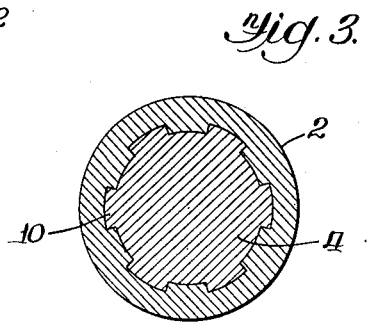
Figure 3 is a sectional view taken along line 3—3 of Figure 1.

Describing the invention in detail, the novel axle assembly comprises a main or fixed shaft or axle 2, said main axle being rigidly and nonrotatably secured to an associated supported vehicle (not shown) and preferably secured to the underside of said vehicle. The axle 2 is hollow adjacent the end thereof and receives in telescoped relation an auxiliary or secondary axle 4, said auxiliary axle 4 having a portion thereof 6 received within said hollow axle 2 and having another portion 8 extending outboardly from the end of the hollow axle 2. A splined connection is provided between the main axle 2 and auxiliary axle 4 at the point adjacent the end of the main axle 2. The splines of said connection indicated at 10 (Figure 3) extend axially of the shafts 2 and 4 whereby the auxiliary shaft 4 may be disassembled from the main shaft 2 by axial movement of said auxiliary shaft. At the inboard end of the auxiliary shaft a peripheral collar 12 is formed, said peripheral collar in the assembled condition being disposed adjacent a pinhole formed on one side of the main shaft 2. A retaining groove pin 14 is disposed within the hole of the main shaft 2 and is complementally received by the collar 12 of the auxiliary shaft 4. Thus it will be seen that the demountable groove pin 14 serves to maintain the shafts 2 and 4 in the assembled telescoped relation.

An inboard bearing block at 16 is rigidly secured to the auxiliary shaft 4 at a point immediately adjacent the end of the main shaft 2. The bearing block 16 is seen to be of substantially cylindrical form offering on its outer periphery a bearing surface 18, the function of which will be hereinafter described. The bearing block 16 further comprises a smaller cylindrical portion 20 immediately adjacent the end of the main shaft 2, said smaller cylindrical portion being designed to abut a grease seal 22, the position and location of which will be hereinafter described.

Another bearing block 24 is mounted on the auxiliary shaft 4 at the outboard extremity thereof and in axially spaced relation with the inboard bearing block 16. The outboard block 24 is journally mounted on the auxiliary shaft 4, said journaled connection being provided by a bearing 26 which is sleeved over the associated portion of the auxiliary shaft 4 and is received within an aperture formed within the bearing block 24. Thus the bearing block 24 is mounted for rotational movement on the end of the auxiliary shaft 4. At the outboard extremity of the auxiliary shaft 4 a demountable collar 28 is provided to abut the related side of the outboard bearing block 24. Additionally, a conventional threaded nut assembly serves to maintain the collar 28 and the bearing block 24 in its proper position on the shaft 4.

A helical coiled spring indicated generally at 30 and comprising a plurality of convolutions surrounding the auxiliary shaft 4 is positioned intermediate the inboard bearing block 16 and outboard bearing block 24. The spring 30 additionally comprises straight end portions 32 and 34 received respectively within complementary apertures formed in the inboard bearing block 16 and outboard bearing block 24. It should be noted that the end portions 32 and 34 are bent to extend axially of the auxiliary shaft 4.

With the heretofore described relation of the various parts including the inboard and outboard bearing blocks, the auxiliary axle, and the coil spring, it will be readily apparent that rotational movements of the outboard bearing block 24 on the axle 4 is resiliently resisted by the torsional stress induced into the coiled spring 30. To achieve proper and maximum efficiency of the coil spring 30, spring shelves or ledges 36 and 38 are integrally formed with the inboard and outboard bearing blocks 16 and 24, respectively. The shelves 36 and 38 are seen to be disposed in telescoped relation within the inside diameter of the adjacent spring convolutions in such a manner as to offer partial support for the inside diameters of said adjacent spring convolution. The spring shelves serve to assure maximum spring efficiency by enabling a maximum bending moment to be induced into the spring during the axle action.

A housing indicated generally at 40 is disposed to surround the auxiliary axle 4, the inboard and outboard bearing blocks 16 and 24 and the associated coiled spring 30. The housing 40 is provided with a rigid connection to the outboard bearing block 24, said connection being provided in any suitable manner, for example, by welding as at 42. The inboard end of the housing receives a bushing 44, said bushing 44 abutting the peripheral bearing surface 18 of the inboard bearing block 16. Thus it will be seen that the housing 40 will rotate with the outboard bearing block 24 about the auxiliary axle 4 and the inboard bearing block 16. The grease seal 22 is disposed within the inboard end of the housing 40 and locked in said position by any suitable means such as a press fit of the seal within the housing end. The grease seal 22 serves to retain any lubricant within the confines of the housing 40. Additionally, however, a cap 46 is provided on and connected to the end of the rigid shaft 2 to close the inboard end of the housing 40 and prevent foreign matter from entering same.

Another cap 48 is secured to the outboard end of the housing by any suitable means, such as, the screw threads indicated at 50. The outboard cap 48 serves to close the outboard end of the housing 40 and to prevent foreign matter entering same.

In the preferred embodiment a pair of crank arms 52, 52 are rigidly connected to the housing 40 in any suitable manner such as, for example, by spot welding. The cranks 52, 52 extend generally transversely of the axis of the main and auxiliary shafts 2 and 4. On the end of the cranks 52, 52 remote from the housing 40, there are integrally carried wheel spindles 54, 54, respectively. The wheel spindles 54, 54 serve to journally mount, by means of a conventional bearing assembly (not shown), the supporting wheels indicated herein phantom at 56, 56. Because of the eccentric spaced relation between the wheel mounting spindles 54 and the main and auxiliary shafts 2 and 4 the suspension assembly here described is usually termed a trailing wheel assembly.

In operation, the main shaft 2 is rigidly secured to the associated vehicle (not shown) and the wheels 56 serve to support said vehicle body. As the vehicle is loaded or as the wheels strike impediments in the roadway, the cranks 52 and the connected housing 40 are urged to rotate about the axis of the auxiliary shaft 4. The rigid connection between the housing 40 and the outboard bearing block 24 causes the bearing block 24 to concurrently rotate with the housing and cranks, said rotation of the bearing block being resiliently resisted by the torsional deformation of the coiled spring 30, due to the fact that the end 32 of said coiled spring is fixed against rotation.

When it becomes desirable to change the relative static or no load angular position of the cranks 52 relative to the axis of the shafts 2 and 4, it is only necessary to remove the retaining pin 14, move the auxiliary axle and associated suspension assembly axially of the main shaft 2 until the splined connection at 10 becomes disengaged, whereupon the cranks 52 and auxiliary axle 4 may be rotated to approximately the desired angular position and the splined connection 10 reassembled together with the retaining pin 14.

We claim:

1. In a wheel suspension assembly for supporting a related vehicle, a hollow shaft rigidly secured to the vehicle, a secondary shaft partially telescoped within said hollow shaft, said secondary shaft extending outwardly from the end of the hollow shaft, a splined connection between the shafts, said connection paralleling the longitudinal axes of said shafts, a demountable retaining pin interconnecting said shafts and maintaining same in telescoped relation, an inboard bearing block rigidly secured to the secondary shaft immediately adjacent the hollow shaft, an outboard bearing block journaled to the secondary shaft in axially spaced relation from the first mentioned block, means on the end of said secondary shaft retaining said outboard block thereon, a coiled spring surrounding the secondary shaft intermediate the blocks, said spring having on its opposite ends straight portions extending axially of the secondary shaft and received within apertures in the respective blocks, a spring shelf on each block telescoped into and supporting the inside diameter of the adjacent convolution of the coiled spring, a housing surrounding the secondary shaft, the bearing blocks and coiled spring, said housing having a journaled connection to the inboard block and a rigid connection to the outboard block, a cap connected to and closing the outboard end of the housing, another cap connected to the hollow shaft and closing the inboard end of the housing, a pair of crank arms rigidly connected to the housing and extending generally transversely of the axes of said shafts, and spindles on the crank arms remote from the housing, said spindles being operative to rotatably mount supporting wheels.

2. In a suspension assembly for supporting a related vehicle, a shaft fixedly and nonrotatably secured to the vehicle, a pair of axially spaced bearing blocks on the shaft, one of said blocks presenting an outer bearing portion and being rigidly secured to the shaft and the other of said blocks being journally mounted on said shaft, spring means interconnecting the blocks and operative to resist relative rotational movement therebetween about the axis of the shaft, a spindle operative to rotatably mount a wheel, and means journally receiving said first-mentioned block and connecting the spindle to the journally mounted bearing block, to permit limited rotation of the spindle about the axis of the shaft.

3. A suspension assembly for supporting a related vehicle according to claim 2, wherein the last mentioned means include a housing having a rigid connection to the journally mounted block and a journal connection to the rigidly secured block.

4. A suspension assembly for supporting the related vehicle according to claim 3, wherein the spring means include a coiled spring surrounding the shaft and having its opposite ends connected to the respective bearing blocks.

5. In an axle assembly, a nonrotatable hollow shaft, a nonrotatable secondary shaft partially telescoped within said hollow shaft and extending outboardly therefrom, means on the portion of the secondary shaft outboardly of the hollow shaft to eccentrically and resiliently carry a wheel, a splined connection between the shafts, and retaining means operative to hold the shafts in telescoped relation, said retaining means being detachable whereby the secondary shaft and the means thereon may be moved axially of the hollow shaft and rotated angularly relative thereto and repositioned within the hollow shaft resulting in the selective variation of the eccentric position of the means relative to the hollow shaft.

6. In an axle assembly, a nonrotatable hollow shaft, a secondary shaft telescoped therein, axially spaced bearing blocks on the secondary shaft remote from the hollow shaft, one of said blocks being secured to the secondary shaft and the other of said blocks being journaled thereon, spring means interconnecting the blocks, a wheel carried by the other of said blocks eccentrically of the shafts, said spring means being the sole means for restraining relative rotational movement between said blocks, and means disposed within the hollow shaft interconnecting the shafts against relative rotation but enabling separation in an axial direction for accommodating selective variation of the static position of the wheel relative to the hollow shaft.

7. An axle assembly according to claim 6, and including quick-detachable means interconnecting the shafts operative to maintain same in telescoped relation.

8. In an axle assembly, a fixed shaft, a block secured thereto, another block journaled to the shaft in spaced relation to the first mentioned block, wheel carrying means carried by the other block including a housing and axially spaced spindles on the housing in eccentric relation to the shaft, a coiled spring having a plurality of interconnected convolutions surrounding the shaft intermediate the blocks and contained in said housing, said spring having its opposite ends connected to the respective blocks, and rigid ledges on the respective blocks received within and supporting the inside diameters of the spring convolutions adjacent the respective blocks.

9. In a suspension arrangement for a vehicle, the combination of: a nonrotatable shaft, another shaft adjustably secured to said first-mentioned shaft, a bearing member rigidly secured to said other shaft, another bearing member journalled on said other shaft and spaced axially of said other shaft from said first-mentioned bearing member, said first-mentioned bearing member presenting an outer bearing portion, a helical torsion spring positioned on said other shaft between said bearing members and having opposed ends secured to the respective bearing members, a housing positioned over said bearings, said housing being journally connected to said first-mentioned bearing member and being rigidly secured to said other bearing member, and wheel carrying means rigidly secured to said housing.

10. A suspension arrangement according to claim 9, wherein said other shaft is telescopically positioned within said first-mentioned shaft and in splined connection therewith.

11. In a vehicle suspension arrangement, a combination of: a shaft, a nonrotatable element rigidly secured to said shaft, a rotatable element journalled on said shaft and spaced axially of the shaft from said nonrotatable element, said nonrotatable element presenting an outer bearing portion, a helical torsion spring disposed on said shaft between said elements and having opposite ends secured to the respective elements, a member journally connected to the nonrotatable element and rigidly connected to the rotatable element, and wheel carrying means rigidly secured to said member.

12. A vehicle suspension arrangement according to claim 11 and including another shaft rigidly secured to the vehicle and in adjustable splined relation to said first-mentioned shaft.

References Cited in the file of this patent

UNITED STATES PATENTS

| 1,956,877 | Prouty et al. | May 1, 1934 |
| 2,426,513 | Linn | Aug. 26, 1947 |
| 2,455,787 | Linn | Dec. 7, 1948 |
| 2,558,311 | Morrow | June 26, 1951 |

FOREIGN PATENTS

| 469,306 | Great Britain | July 22, 1937 |
| 542,409 | Great Britain | Jan. 8, 1942 |
| 636,972 | Germany | Oct. 20, 1936 |